(12) United States Patent
Mundhenk et al.

(10) Patent No.: US 9,754,165 B2
(45) Date of Patent: Sep. 5, 2017

(54) AUTOMATED GRAPH LOCAL CONSTELLATION (GLC) METHOD OF CORRESPONDENCE SEARCH FOR REGISTRATION OF 2-D AND 3-D DATA

(71) Applicant: The Boeing Company, Chicago, IL (US)

(72) Inventors: Terrell Nathan Mundhenk, Calabasas, CA (US); Kyungnam Kim, Oak Park, CA (US); Yuri Owechko, Newbury Park, CA (US); Hai-Wen Chen, Aberdeen, MD (US)

(73) Assignee: The Boeing Company, Chicago, IL (US)

( * ) Notice: Subject to any disclaimer, the term of this patent is extended or adjusted under 35 U.S.C. 154(b) by 430 days.

(21) Appl. No.: 13/953,757

(22) Filed: Jul. 30, 2013

(65) Prior Publication Data

US 2015/0036870 A1 Feb. 5, 2015

(51) Int. Cl.
*G06K 9/00* (2006.01)
*G06K 9/62* (2006.01)
*G06T 7/33* (2017.01)

(52) U.S. Cl.
CPC ..... *G06K 9/00624* (2013.01); *G06K 9/00637* (2013.01); *G06K 9/6211* (2013.01); *G06T 7/33* (2017.01); *G06T 2207/10028* (2013.01); *G06T 2207/10032* (2013.01); *G06T 2207/10048* (2013.01); *G06T 2207/20036* (2013.01); (Continued)

(58) Field of Classification Search
None
See application file for complete search history.

(56) References Cited

U.S. PATENT DOCUMENTS 8,463,459 B2 6/2013 Breshears
2002/0059042 A1* 5/2002 Kacyra ............... G01B 11/002
702/152

(Continued)

OTHER PUBLICATIONS

Vector Algegra, http://emweb.unl.edu/math/mathweb/vectors/vectors.html, 2008.*

(Continued)

*Primary Examiner* — Sumati Lefkowitz
*Assistant Examiner* — Jiangeng Sun
(74) *Attorney, Agent, or Firm* — McDonnell Boehnen Hulbert & Berghoff LLP

(57) ABSTRACT

According to an embodiment, a 2-dimensional (2-D) image of a geographical region is transformed via a regional maxima transform (RMT) or an edge segmenting and boundary filling (ESBF) transform to produce a filtered 2-D image. The filtered 2-D image is iteratively eroded and opened to produce a processed EO 2-D image, 2-D object shape morphology is extracted from the processed EO 2-D image, and 2-D shape properties are extracted from the 2-D object shape morphology. A height slice of a 3-dimensional (3-D) point cloud comprising 3-D coordinate and intensity measurements of the geographical region is generated, and slice object shape morphology is extracted from the height slice. Slice shape properties from the slice object shape morphology are extracted, and the 2-D image is constellation matched to the height slice based on the 2-D shape properties and the slice shape properties.

19 Claims, 8 Drawing Sheets

(52) U.S. Cl.
CPC ........... *G06T 2207/20072* (2013.01); *G06T 2207/30181* (2013.01); *G06T 2207/30252* (2013.01)

(56) References Cited

U.S. PATENT DOCUMENTS

| | | | | |
|---|---|---|---|---|
| 2010/0207936 | A1* | 8/2010 | Minear | G06T 7/30 345/419 |
| 2010/0209013 | A1* | 8/2010 | Minear | G06T 7/0026 382/260 |
| 2014/0257595 | A1* | 9/2014 | Tillmann | G01C 11/02 701/2 |
| 2014/0307247 | A1* | 10/2014 | Zhu | G01S 17/023 356/4.01 |

OTHER PUBLICATIONS

Huber, M., Schickle, W., Him, S., & Baumgartne, A. (2003). Fusion of LIDAR dam and aerial imagery for automatic reconstruction of building surfaces. Paper presented at the GRSS/ISPRS Joint Workshop on Remote Sensing and Data Fusion over Urban Areas, Wessling, Gennany.

Lee, D. H., Lee, K. M., & Lee, S. U. (2008). Fusion of Lidar and Imagery for Reliable Building Extraction. Phntogrammetric Engineering & Remote Sensing, 74(2), 215-225.

Mastin, A., Kepner, 1., & Fisher, J. (2009). Automatic Registration of LIDAR and Optical Images of Urban Scenes. Paper presented at the CVPR, Miami Beach, Florida.

Moreno-Noguer, F., Lepetit, V., & Fua, P. (2007). Accurate Nun-Iterative O(n) Solution 10 the PnP Problem.Paper presented at the IEEE International Conference on Computer Vision (ICCV), Rio de Janeiro, Brazil.

Salah, M., Trinder, J., Shaker, A., I-Iamed, M., & Elsagheer, A. (2009). Aerial Images and LIDAR Data Fusion for Automatic Feature Extraction Using the Self-Organizing Map (SOM) Classifier. In F. Bretar, M. Pienot-Deseilligny & G. Vosselman (Eds), Laser scanning (vol. XXXVIII). Paris: IAPRS.

Schenk, T., & Csatho, B. (2002). Fusion of LIDAR Data and Aerial Imagery for a More Complete Surface Description Paper presented at the ISPRS, Graz, Austria.

Vincent Lepetit , Francesc Moreno-Noguer , Pascal Fua. EPnP: An Accurate O(n) Solution to the PnP Problem, Springer Science+Business Media, 2008.

Soille, P. (1999). Morphological Image Analysis: Principles and Applications (pp. 170-171): Springer-Verlag.

Extended European Search Report issued in European Patent Application No. 14178714.3 dated Dec. 12, 2014.

Kwak, Tae-Suk et al., "Registration of Aerial Imagery and Aerial LiDAR Data Using Centroids of Plane Roof Surfaces as Control Information", KSCE Journal of Civil Engineering, vol. 10, No. 5, Sep. 2006, pp. 365-370.

Lee, Jun Hak "Automated Approaches for Extracting Individual Tree Level Forest Information using High Spatial Resolution Remotely Sensed Data", Electronic Thesis and Dissertations, UC Berkeley, https://escholarship.org/uc/item/1z1861t7, Jan. 2010.

Mishra, Rakesh Kumar et al., "A Review of Optical Imagery and Airborne LiDAR Data Registration Methods", The Open Remote Sensing Journal, vol. 5, 2012, pp. 54-63.

Schenk, Toni et al., "Fusion of LiDAR Data and Aerial Imagery for a More Complete Surface Description", International Archives of Photogrammetry and Remote Sensing, Jan. 2002, pp. 1-8.

Wang, Quan et al., "Automatic Registration of Large-Scale Multi-Sensor Datasets", Trends and Topics in Computer Vision, Sep. 10, 2010, pp. 225-238.

Wong, Alexander et al., "Efficient FFT-Accelerated Approach to Invariant Optical-LiDAR Registration", IEEE Transactions on Geoscience and Remote Sensing, vol. 46, No. 11, Nov. 2008, pp. 3917-3925.

Xu, Jiejun et al., "2D/3D Sensor Exploitation and Fusion for Enhanced Object Detection", 2014 IEEE Conference on Computer Vision and Pattern Recognition Workshops, IEEE, Jun. 2014, pp. 778-784.

Yao, Wei et al., "Automatic Vehicle Extraction Form Airborne LiDAR Data of Urban Areas Aided by Geodesic Morphology", Pattern Recognitions Letters, vol. 31, No. 10, Jul. 2010, pp. 1100-1108.

Examination Report prepared by the European Patent Office in Application No. 14 178 714.3, dated Dec. 21, 2016.

* cited by examiner

AUTOMATED GRAPH LOCAL CONSTELLATION (GLC) METHOD OF CORRESPONDENCE SEARCH FOR REGISTRATION OF 2-D AND 3-D DATA

FIELD

Embodiments of the present disclosure relate generally to viewing systems and methods. More particularly, embodiments of the present disclosure relate to 3-dimensional (3-D) image to 2-dimensional (2-D) image correspondence systems and methods.

BACKGROUND

Geolocation of an unmanned aerial vehicle (UAV) from visual data alone may be accomplished by use of 2-D and 3-D data fusion to estimate location. Current methods add complexity and are a potential source of error.

SUMMARY

A system and method for registration of two and three-dimensional images is presented. According to an embodiment, a 2-dimensional (2-D) image of a geographical region is transformed via a regional maxima transform or an edge segmenting and boundary filling (ESBF) transform to produce a filtered 2-D image. The filtered 2-D image is eroded and opened to produce a processed electro optical (EO) 2-D image, 2-D object shape morphology is extracted from the processed EO 2-D image, and 2-D shape properties are extracted from the 2-D object shape morphology. A height slice of a 3-dimensional point cloud comprising Light Detection and Ranging (LIDAR) measurements of the geographical region is generated, and slice object shape morphology is extracted from the height slice. Slice shape properties from the slice object shape morphology are extracted, and the 2-D image is constellation matched to the height slice based on the 2-D shape properties and the slice shape properties.

In an embodiment, a method for registration of two and three-dimensional images transforms a 2-dimensional (2-D) image of a geographical region via a regional maxima transform or an edge segmenting and boundary filling (ESBF) transform to produce a filtered 2-D image. The method further erodes and opens the filtered 2-D image to produce a processed EO 2-D image, extracts 2-D object shape morphology from the processed EO 2-D image, and extracts 2-D shape properties from the 2-D object shape morphology. The method further generates a height slice of a 3-dimensional point cloud comprising LIDAR measurements of the geographical region, and extracts slice object shape morphology from the height slice. The method further extracts slice shape properties from the slice object shape morphology, and constellation matches the 2-D image to the height slice based on the 2-D shape properties and the slice shape properties.

In another embodiment, a system for registration of two and three-dimensional images comprises a regional maxima transform module, a filter module, a 2-D morphology module, a 2-D shape extraction module, a height slice module, a 3-D morphology module, a 3-D shape extraction module, and a constellation matching module. The regional maxima transform module transforms a 2-dimensional (2-D) image of a geographical region via a regional maxima transform or an edge segmenting and boundary filling (ESBF) transform to produce a filtered 2-D image. The filter module erodes and opens the filtered 2-D image to produce a processed EO 2-D image. The 2-D morphology module extracts 2-D object shape morphology from the processed EO 2-D image. The 2-D shape extraction module extracts 2-D shape properties from the 2-D object shape morphology. The height slice module generates a height slice of a 3-dimensional point cloud comprising LIDAR measurements of the geographical region. The 3-D morphology module extracts slice object shape morphology from the height slice. The 3-D shape extraction module extracts slice shape properties from the slice object shape morphology. The constellation matching module constellation matches the 2-D image to the height slice based on the 2-D shape properties and the slice shape properties.

In a further embodiment, a non-transitory computer readable storage medium comprises computer-executable instructions for registration of two and three-dimensional images. The computer-executable instructions transform a 2-dimensional (2-D) image of a geographical region via a regional maxima transform or an edge segmenting and boundary filling (ESBF) transform to produce a filtered 2-D image. The computer-executable instructions further erode and open the filtered 2-D image to produce a processed EO 2-D image, extract 2-D object shape morphology from the processed EO 2-D image, and extract 2-D shape properties from the 2-D object shape morphology. The computer-executable instructions further generate a height slice of a 3-dimensional point cloud comprising LIDAR measurements of the geographical region, and extract slice object shape morphology from the height slice, and extract slice shape properties from the slice object shape morphology. The computer-executable instructions further constellation match the 2-dimensional (2-D) image to the height slice based on the 2-D shape properties and the slice shape properties.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
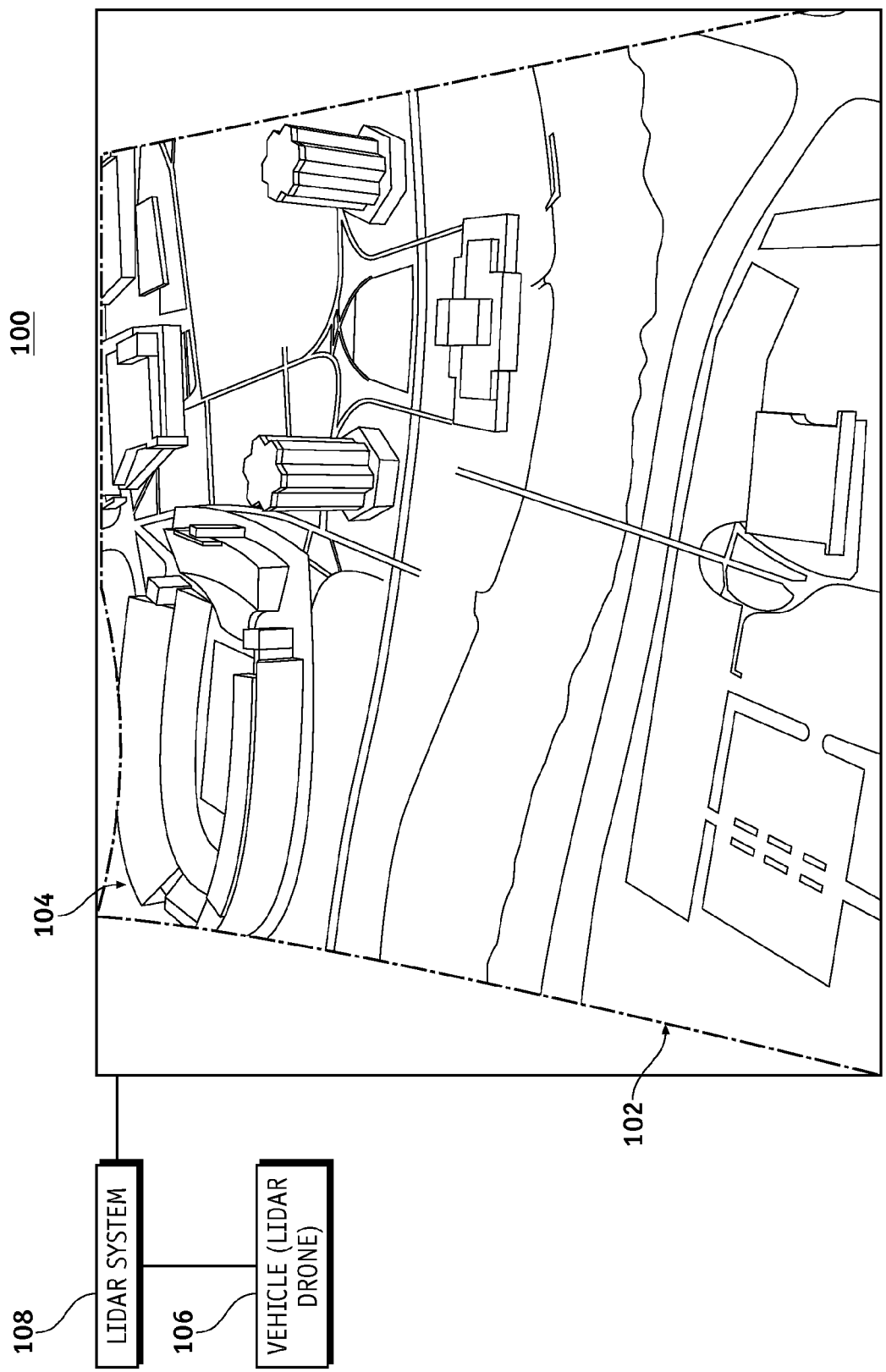
FIG. 1 is an illustration representing a Light Detection and Ranging (LIDAR) point cloud measured over a region.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to two-dimensional (2-D) and three-dimensional (3-D) imaging systems, imaging techniques, computing camera location, and other functional aspects of the systems (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, landscape imaging for location finding. Embodiments of the disclosure, however, are not limited to such applications, and the techniques described herein may also be utilized in other applications. For example but without limitation, embodiments may be applicable to combat information centers, underwater navigation, construction, mining and petroleum engineering, electronic games, scientific visualization, user interfaces, interacting with architectural models, computed aided drafting systems, or any environment represented as a three-dimensional model, and the like. Moreover, embodiments of the disclosure are applicable to, for example but without limitation, navigating through virtual training facilities comprising ground terrain, buildings, foliage, and other physical structures.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Embodiments of the disclosure provide a system that can take a 3-D point cloud recorded using a Light Detection and Ranging (LIDAR) sensor and find useful corresponding points in a 2-D image taken over the same geographical region. These corresponding points can then be used for such things as camera pose estimation which allows fusion between image pixels and LIDAR points. For an example for clarity, consider that an aerial vehicle (e.g., LIDAR drone) flies over a region such as a city, and scans the city below with its LIDAR system, building a 3-D map of the city. This map may comprise a point cloud image made up of, without limitation, thousands or even millions of points which are samples of a 3-D position of a surface where a LIDAR light beam incidents an object.

FIG. 1 is an illustration representing a Light Detection and Ranging (LIDAR) point cloud image 100 measured over a geographical region 102 (region 102) by a LIDAR system 108. A LIDAR drone 106 (vehicle system, first vehicle system) flies over the region 102 and scans the geographical region 102 below with its LIDAR system 108, building a 3-D map of the region 102. This map is shown as the point cloud image 100. The point cloud image 100 may comprise, without limitation, thousands or even millions of 3-D cloud image points of the geographical region 102, which are samples of a 3-D position of a surface of an object where a beam of light from the LIDAR system 108 struck an object in the region 102.

A stadium 104 can be seen in an upper left corner of the point cloud image 100. In this example, intensity of points correspond to an object's reflectivity.

Figure 2:
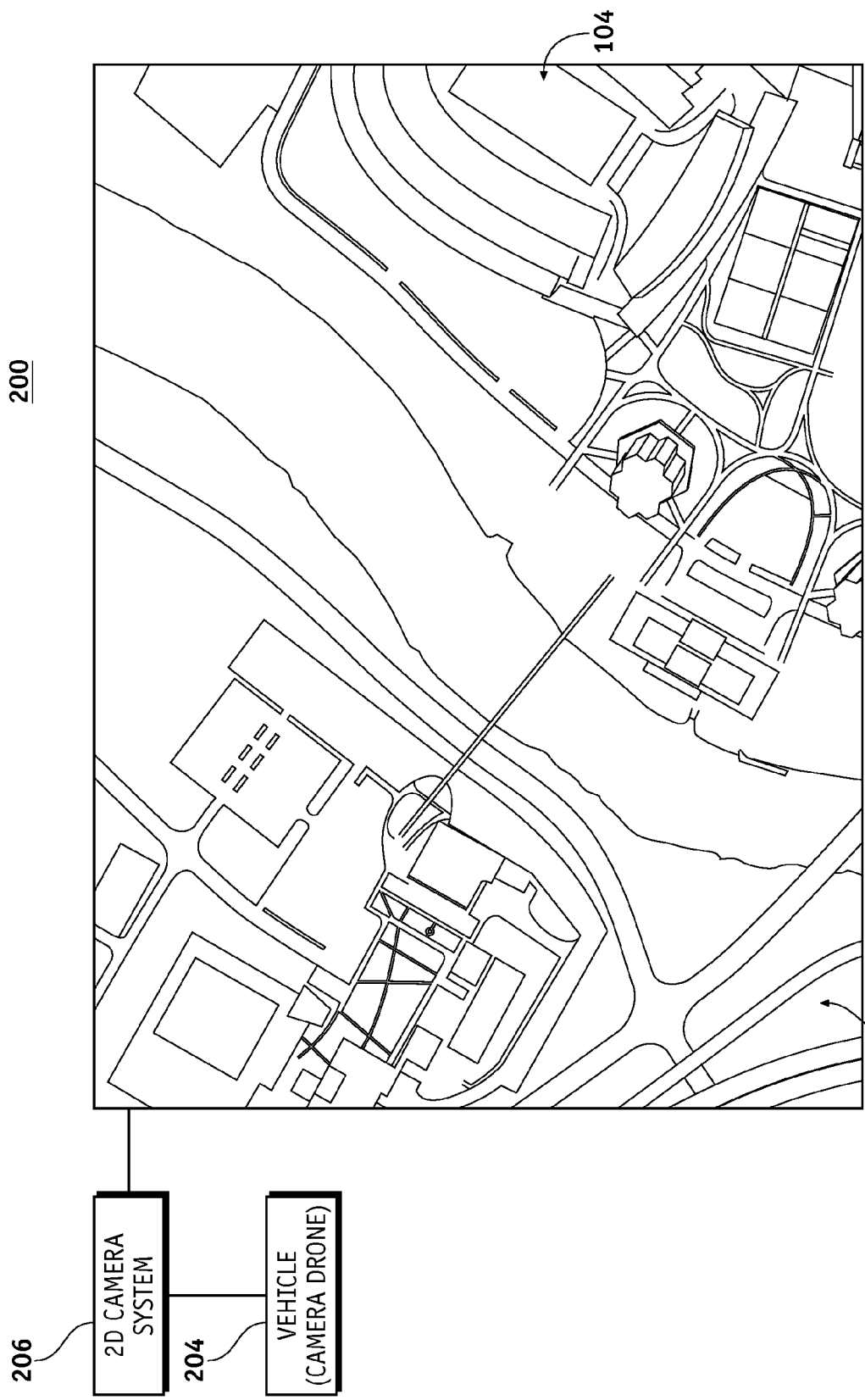
FIG. 2 is an illustration representing an exemplary electro-optical (EO) two-dimensional (2-D) image from a camera drone measured over the region shown in FIG. 1.

FIG. 2 is an illustration of an exemplary two-dimensional (2-D) electro-optical (EO) image from a camera drone 204 measured over the region 102 shown in FIG. 1. In an example scenario, the camera drone 204 flies over the region 102 several months later relative to a time the point cloud image 100 was taken, but has access to the point cloud image 100 of the LIDAR drone 106. The camera drone 204 flies over the geographical region 102 taking pictures of a scene 200 comprising 2-D image points shown in FIG. 2. A human observer can easily determine that the scene 200 (2-D image 200) is the same geographical region 102 (region 102) that was point cloud imaged by the LIDAR system 108 in FIG. 1.

The camera drone 204 is configured to use the scene 200 the camera drone 204 has captured to determine a location of the camera drone 204. This is useful if Global Positioning System (GPS) data is not available or is determined to be inaccurate. Also, image data of the scene 200 can be used to color the point cloud image 100 to be easier for humans to read. The camera drone 204 may comprise, for example but without limitation, a short wave infra-red (SWIR) camera, or other type of camera technology. A system 300 described below is designed to enable these functions automatically.

Figure 3:
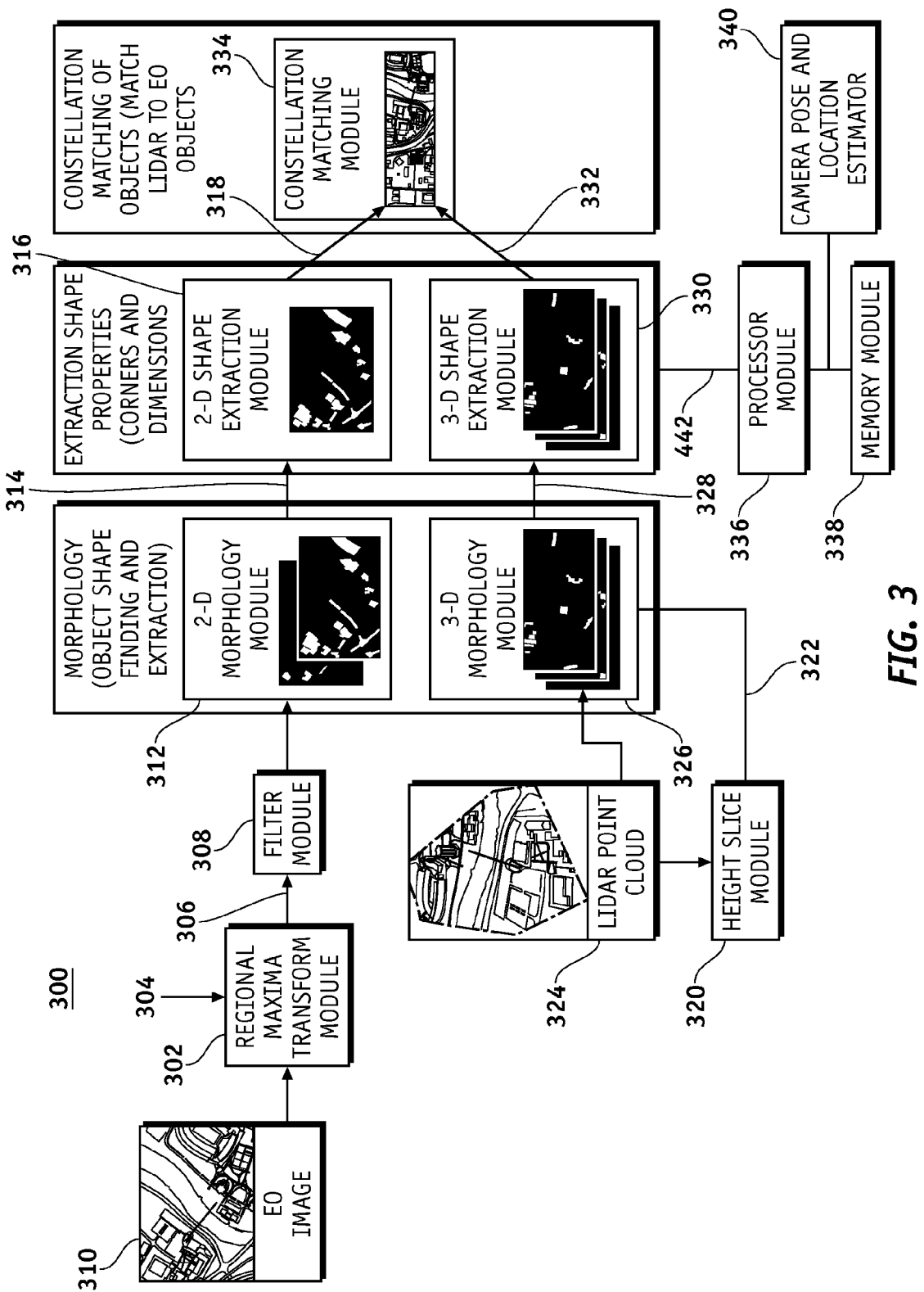
FIG. 3 is an illustration of a schematic functional block diagram of a system for registration of two and three-dimensional images according to an embodiment of the disclosure.

FIG. 3 is an illustration of a schematic functional block diagram of a system 300 for registration of two and three-dimensional images according to an embodiment of the disclosure. The system 300 takes the point cloud image 100 from the LIDAR drone 106 and the 2-D image 200 from the camera drone 204 and finds common locations. For example, if the system 300 finds corners of a hexagonal building in the point cloud image 100 and the same corners in the 2-D image 200, the system 300 can use those corresponding points to determine the location and pose of the 2-D camera system 206 on the camera drone 204 in a LIDAR three-dimensional (3-D) space. Once the location is known, system 300 then paints the point cloud image 100 with the colors from the 2-D image 200 with a process called fusion. The 2-D image 200 and the point cloud image 100 may comprise substantially matching points.

The system 300 is configured to determine, for instance, that a northwest corner of a building A is located at coordinates u, v in the 2-D image 200 and is located at coordinates x, y, z in the point cloud image 100, comprising 3-D (e.g., XYZ) coordinates. The system 300 finds these building corners which are paired between the point cloud image 100 and the 2-D image 200. This then enables other algorithms of the system 300 to be run which take these paired points and determines the location of the camera drone 204 or colors the point cloud image 100 with the 2-D image 200. The system 300 may only need to find a small number of matching pairs. So, the system 300 can be selective in how it finds them. The system 300 may need 12 matching pairs, but may provide accurate 3-D to 2-D correspondence with, for example, as few as six matching pairs. A process performed by the system 300 comprises three major steps: morphology, shape extraction and constellation matching.

There are similarities between ways in which the point cloud image 100 and the 2-D image 200 are processed to find corners of buildings which are then merged together in a step of constellation graph matching. The system 300 may comprise: a regional maxima transform module 302, a filter module 308, a 2-D morphology module 312, a 2-D shape extraction module 316, a height slice module 320, a 3-D morphology module 326, a 3-D shape extraction module 330, a constellation matching module 334, a processor module 336, a memory module 338, and a camera pose and location estimator (CPLE) 340. The system 300 may comprise a LIDAR point cloud 324 and a processed EO image 310 as data input.

The regional maxima transform module 302 transforms a 2-dimensional (2-D) image 310 (200 in FIG. 1) of a geographical region such as the region 102 via a regional maxima transform or an edge segmenting and boundary filling (ESBF) transform to produce a filtered 2-D image 306.

The filter module 308 iteratively erodes and opens the filtered 2-D image 306 to produce a processed EO 2-D image 310. Eroding may comprise, for example but without limitation, (mathematical) image morphology closing, image morphologically closing a shape or object in an image, removing holes or open spaces in a shape or object in an image, removing holes or open spaces smaller than a specified size in a shape or object in an image, or other suitable image morphology operation. Opening may comprise, for example but without limitation, (mathematical) image morphology opening, image morphologically opening a shape or object in an image, removing shapes or objects in an image, removing shapes or objects smaller than a specified size in an image, or other suitable image morphology operation. A shape may comprise, for example but without limitation, a geometrical description of a space or area occupied by an object as determined by an external boundary of the object.

The 2-D morphology module 312 extracts 2-D object shape morphology 314 from the processed EO 2-D image 310. The 2-D shape extraction module 316 extracts 2-D shape properties 318 from the 2-D object shape morphology 314. The height slice module 320 generates a height slice 322 of a 3-dimensional point cloud 324 (100 in FIG. 1) comprising LIDAR measurements of the geographical region. The 3-D morphology module 326 extracts slice object shape morphology 328 from the height slice 322. The 3-D shape extraction module 330 extracts slice shape properties 332 from the slice object shape morphology 328. The constellation matching module 334 constellation matches the 2-D image 304 to the height slice 322 based on the 2-D shape properties 318 and the slice shape properties 332.

The regional maxima transform module 302 transforms a 2-dimensional (2-D) image 304 of a geographical region via a regional maxima transform or an edge segmenting and boundary filling (ESBF) transform to produce a filtered 2-D image 306.

The filter module 308 (iteratively) erodes and opens the filtered 2-D image 306 to produce a processed EO 2-D image 310. The processed EO 2-D image 310 comprises a processed image that is based on and may look like binary images in the 2-D morphology module 312.

The height slice module 320 generates a height slice 322 of a 3-D point cloud 324 comprising LIDAR measurements of the geographical region 102.

The 2-D morphology module 312 extracts 2-D object shape morphology 314 from the EO 2-D image 310.

The 3-D morphology module 326 extracts slice object shape morphology 328 from the height slice 322.

The system 300 determines a location of meaningful shapes in two data sources: the processed EO 2-D image 310 and the 3-D point cloud 324. Building roofs may be substantially ideal examples, since they may have a uniform color and height. Also, roof tops tend to denote well a location of building corners. To maintain a proper generic framework, the 2-D morphology module 312 may frequently refer to roof candidates simply as shapes since any object with consistent height and color may be a good object to use for matching. So, for the processed EO 2-D image 310, the 2-D morphology module 312 can search for patches of substantially uniform color. However, for the 3-D point cloud 324 the 3-D morphology module 326 can search for regions of substantially uniform height.

As shown in FIG. 3, there are several shape binary images per each processed EO 2-D image 310 (input source). For the processed EO 2-D image 310 this is because the 2-D morphology module 312 uses more than one method to find places of uniform color. The 2-D morphology module 312 uses two methods discussed below, but the 2-D morphology module 312 can use a variety of image segmentation and shape finding methods either individually or at the same time.

To find places of uniform height in the 3-D point cloud 324, the 3-D morphology module 326 takes a large number of 2-D slices 322 of the 3-dimensional point cloud 324 generated by the height slice module 320 at differing heights. Each of the 2-D slices 322 may comprise a roof candidate. As with the processed EO 2-D image 310, a variety of roof detection methods in addition to the methods described herein can be used.

Once the 2-D morphology module 312 and 3-D morphology module 326 have found shapes in each of the processed EO 2-D image 310 and the 3-D point cloud 324 respectively, they are then labeled. So, the 2-D object shape morphology 314 is extracted from the 2-D morphology module 312 and the slice object shape morphology 328 is extracted from the 3-D morphology module 326. These output comprise a set of labeled shapes of possible roof tops in both the processed EO 2-D image 310 and the 3-D point cloud 324. These labeled shapes can then be passed on to the 2-D shape extraction module 316 and the 3-D shape extraction module 330 respectively. The labeled shapes remain separate until merged by the constellation matching module 334 where substantially matching data between EO 2-D image 310 and the 3-D point cloud 324 are matched as explained below.

The 2-D shape extraction module 316 extracts 2-D shape properties 318 from the 2-D object shape morphology 314. The 2-D shape extraction module 316 characterizes the labeled shapes.

The 2-D shape extraction module 316 is configured to determine:

(1) Location of corners—2-D shape extraction module 316 uses these location(s) to create the matched points between the processed EO 2-D image 310 and the 3-D point cloud 324.

(2) Shape descriptions—the 2-D shape extraction module 316 matches roof tops between the processed EO 2-D image 310 and the 3-D point cloud 324 since this allows corner matching.

Item (1) has been discussed previously. Finding corners for each shape can be done by searching for extrema points in the shape. An equally important part is (2). What the 2-D shape extraction module 316 is designed to accomplish is to determine which roof top shape extracted from the processed EO 2-D image 310 matches to its counterpart in the 3-D point cloud 324. This is may be made difficult since roof tops in the processed EO 2-D image 310 may not be at a same scale or rotation as roof tops in the 3-D point cloud 324. For example, when the LIDAR drone 106 creates the point cloud image 100 aligned north to south and the camera drone 204 is flying south-east, the processed EO 2-D image 310 from the camera drone 204 will be rotated relative to a viewpoint of the aligned 3-D point cloud 324. For example, properties that the 2-D shape extraction module 316 extracts about shapes need to be agnostic with respect to rotation and scale. The properties may comprise, for example but without limitation, a ratio of height to width for roof candidates, and/or other metrics.

The 3-D shape extraction module 330 extracts slice shape properties 332 from the slice object shape morphology 328.

The constellation matching module 334 constellation matches the 2-D image 304 to the height slice 322 based on the 2-D shape properties 318 and the slice shape properties 332. The constellation matching module 334 is configured to utilize constellation matching to match objects in the processed EO 2-D image 310 data and the 3-D point cloud 324 data. During constellation matching, the constellation matching module 334 attempts to match roof tops in the LIDAR 2-D slices 322 with the roof tops in the processed EO 2-D image 310 using relationships between corner features. To limit a size of search space, the constellation matching module 334 may use N largest roofs and toss away smaller ones, where N is an integer. Additionally, the constellation matching module 334 may begin to create roof tuples, which are subsets of roofs that are related. This is because matching accuracy of the constellation matching module 334 may increase with a number of matches at a time.

Figure 4A:
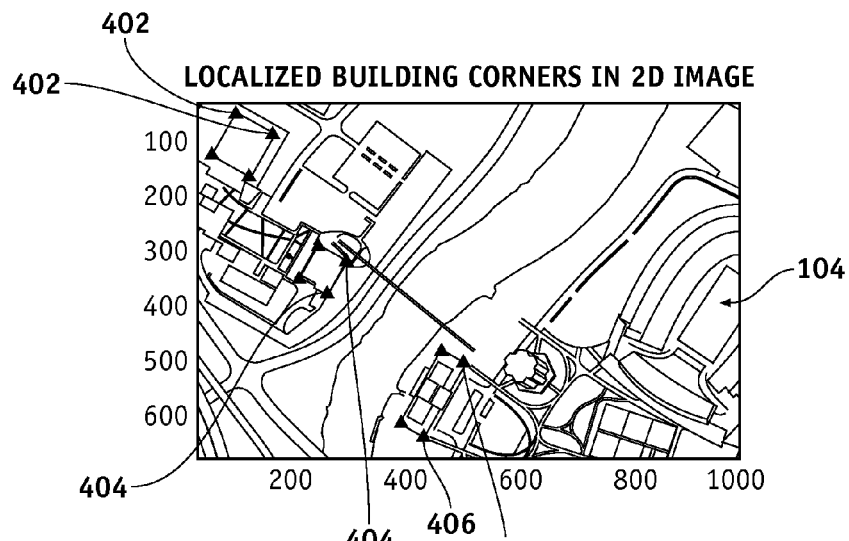
FIGS. 4A and 4B are illustrations of sets of matched points created by the system of FIG. 3 according to an embodiment of the disclosure.
Figure 4B:
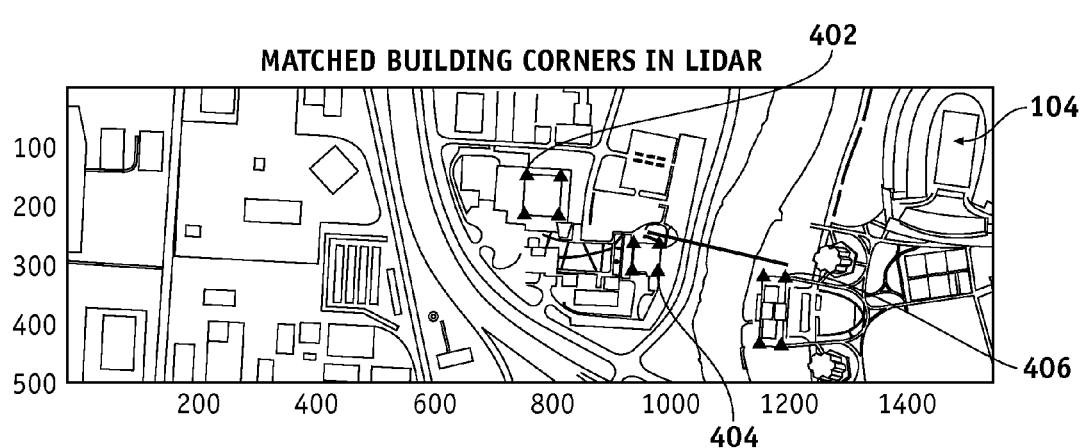

This may be easy to understand since roof tops can be similar. So matching comprises relationships between roofs. To shorten matching processing, the constellation matching module 334 may only match roof tuples which are very close and ignore roof tops which are very far apart. Attempts to match roof tuples between the processed EO 2-D image 310 data and the 3-D point cloud 324 data yields an error score per potential matches. The constellation matching module 334 may then take a best M (where M is an integer) matches (e.g., comprising a lowest error score) between 2-D and 3-D data as a final matched set and return a set of matched corners from the processed EO 2-D image 310 data and the 3-D point cloud 324. An example of output sets of matched points 402, 404 and 406 is shown in FIGS. 4A and 4B.

The processor module 336 comprises processing logic that is configured to carry out the functions, techniques, and processing tasks associated with the operation of the system 300. In particular, the processing logic is configured to support the system 300 described herein. For example, the processor module 336 can direct the system 300 to determine a set of matched corners from the two processed EO 2-D image 310 data and the 3-D point cloud 324.

The processor module 336 also accesses data stored in the memory module 338 to support functions of the system 300. The data may comprise, for example but without limitation, coordinates of a roof top, camera drone location, virtual camera vector extrapolation information, 3-D polygon positions, image texture data, texture metadata, terrain representations (e.g., buildings, trees, ground, map), and other data.

The processor module 336 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 338 may be a data storage area with memory formatted to support the operation of the system 300. The memory module 338 is configured to store, maintain, and provide data as needed to support the functionality of the system 300 in the manner described herein. In practical embodiments, the memory module 338 may comprise, for example but without limitation, a non-volatile storage medium or device (non-volatile semiconductor memory, hard disk device, optical disk device, and the like), a random access storage device (e.g., static random access memory (SRAM), dynamic random access memory (DRAM)), or any other form of storage medium known in the art.

The memory module 338 may be coupled to the processor module 336 and configured to store, for example but without limitation, a database, and the like. Additionally, the memory module 338 may represent a dynamically updating database containing a table for updating the database, and the like. The memory module 338 may also store, a computer program that is executed by the processor module 336, an operating system, an application program, tentative data used in executing a program, and the like.

The memory module 338 may be coupled to the processor module 336 such that the processor module 336 can read information from and write information to the memory module 338. As an example, the processor module 336 and memory module 338 may reside in respective application specific integrated circuits (ASICs). The memory module 338 may also be integrated into the processor module 336. In an embodiment, the memory module 338 may comprise a cache memory for storing temporary variables or other intermediate information during execution of instructions to be executed by the processor module 336.

The system 300 may comprise, for example but without limitation, a desktop, a laptop or notebook computer, a hand-held computing device (personal digital assistant (PDA), cell phone, palmtop, etc.), a mainframe, a server, a client, or any other type of special or general purpose computing device as may be desirable or appropriate for a given application or environment.

The various illustrative blocks, modules, processing logic, and circuits described in connection with the system 300 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

The illustrated system 300 depicts a simple embodiment for ease of description. These and other elements of the system 300 are interconnected together, allowing communication between the various elements of the system 600. In one embodiment, these and other elements of the system 300 may be interconnected together via a data communication bus 342.

The camera pose and location estimator 340 is configured to match points of the process 2-D EO image 310 and the 3-D point cloud 324 based on the 2-D shape properties 318 and the slice shape properties 332 and estimate a pose position of the 2-D camera system 206 based on the matching points 402 and 404 (FIGS. 4A and 4B) to provide an estimated pose position. The camera pose and location estimator 340 is further configured to determine a geo-location of the camera drone 204 based on the estimated pose position as explained in more detail below.

FIGS. 4A and 4B are illustrations of sets of the matched points created by the constellation matching module 334 of the system 300 according to an embodiment of the disclosure. FIG. 4A shows a location of 12 points in the processed 2-D EO image 310. The matched points 402, 404 and 406 represent a building roof top each set is associated with. FIG. 4B shows the matched points 402, 404 and 406 against a height map from the 3-D point cloud 324. As shown in FIGS. 4A and 4B, the matched points 402, 404 and 406 correspond very well.

Once the sets of matched points 402, 404 and 406 are determined between the processed EO 2-D image 310 and the 3-D point cloud 324, system 300 feeds the matched points 402, 404 and 406 into the camera pose and location estimator 340 (matching point image analyzer 340). The camera pose and location estimator 340 may estimate a camera pose based on techniques such as an Efficient Perspective-n-Point EPnP or other camera pose estimation techniques known in the art.

As mentioned above, the camera pose and location estimator 340 is configured to match points of the processed 2-D EO image 310 and the 3-D point cloud 324 based on the 2-D shape properties 318 and the slice shape properties 332 and estimate a pose position of the 2-D camera system 206 position based on the matching points 402, 404 and 406 to provide an estimated pose position. The camera pose and location estimator 340 is further configured to determine a geo-location of the camera drone 204 based on the estimated pose position.

Figure 5:
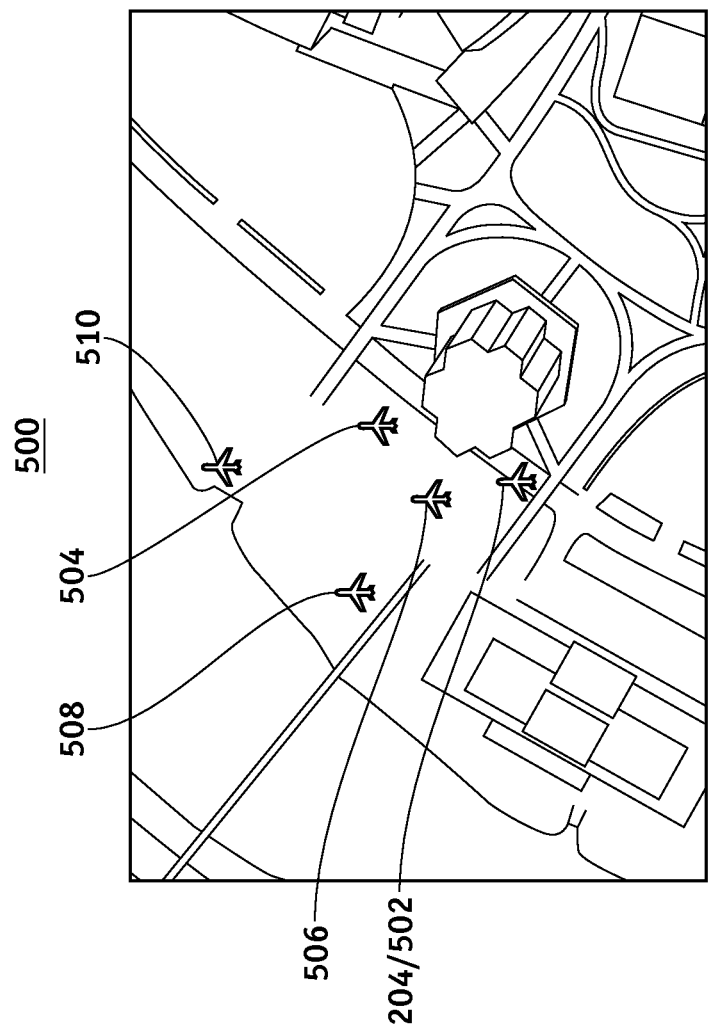
FIG. 5 is an illustration showing an estimated position of a camera drone according to an embodiment of the disclosure.

This yields the camera pose and location. Since the 2-D camera system 206 is attached to the camera drone 204, system 300 therefore knows the location of the camera drone 204 relative to the 3-D point cloud 324. Since the 3-D point cloud 324 are typically calibrated into world coordinates or geo-registered, this means the system 300 knows the location of the camera drone 204 in the world. Additionally, once the location and pose of the camera drone 204 is known, the system 300 can fuse the processed EO 2-D image 310 and the 3-D point cloud 324. This provides an enhanced point cloud with true colors. FIG. 5 shows a representation of some of the automated results provided by the system 300.

FIG. 5 is an illustration 500 showing an estimated position 502 of the camera drone 204 according to an embodiment of the disclosure. FIG. 5 shows the estimated position 502 of the camera drone 204 from the camera pose and location estimator 340 using the sets of matched points 402, 404 and 406 provided by the constellation matching module 334. A Global Positioning System (GPS) provided location 506 is shown between the plane icons 504 and 508. The estimated position 502 of the camera drone 204 provided by the system 300 is less than about 50 meters (about 164 feet) from the GPS provided location 506 in this example. Additional optimization methods may be used to yield other location estimates 510.

Figure 6:
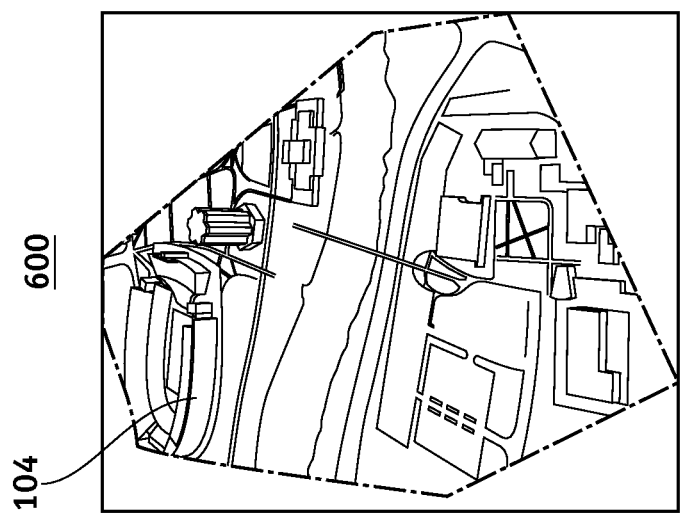
FIG. 6 is an illustration representing an exemplary fused LIDAR/2-D image derived from the estimates position of the camera drone shown in FIG. 5 according to and embodiment of the disclosure.

FIG. 6 is an illustration of an exemplary fused LIDAR/2-D image 600 derived from the estimated position 502 of the camera drone 204 shown in FIG. 5 according to an embodiment of the disclosure. Un-fused scene of the fused LIDAR/2-D image is shown in FIG. 1 for comparison.

Figure 7:
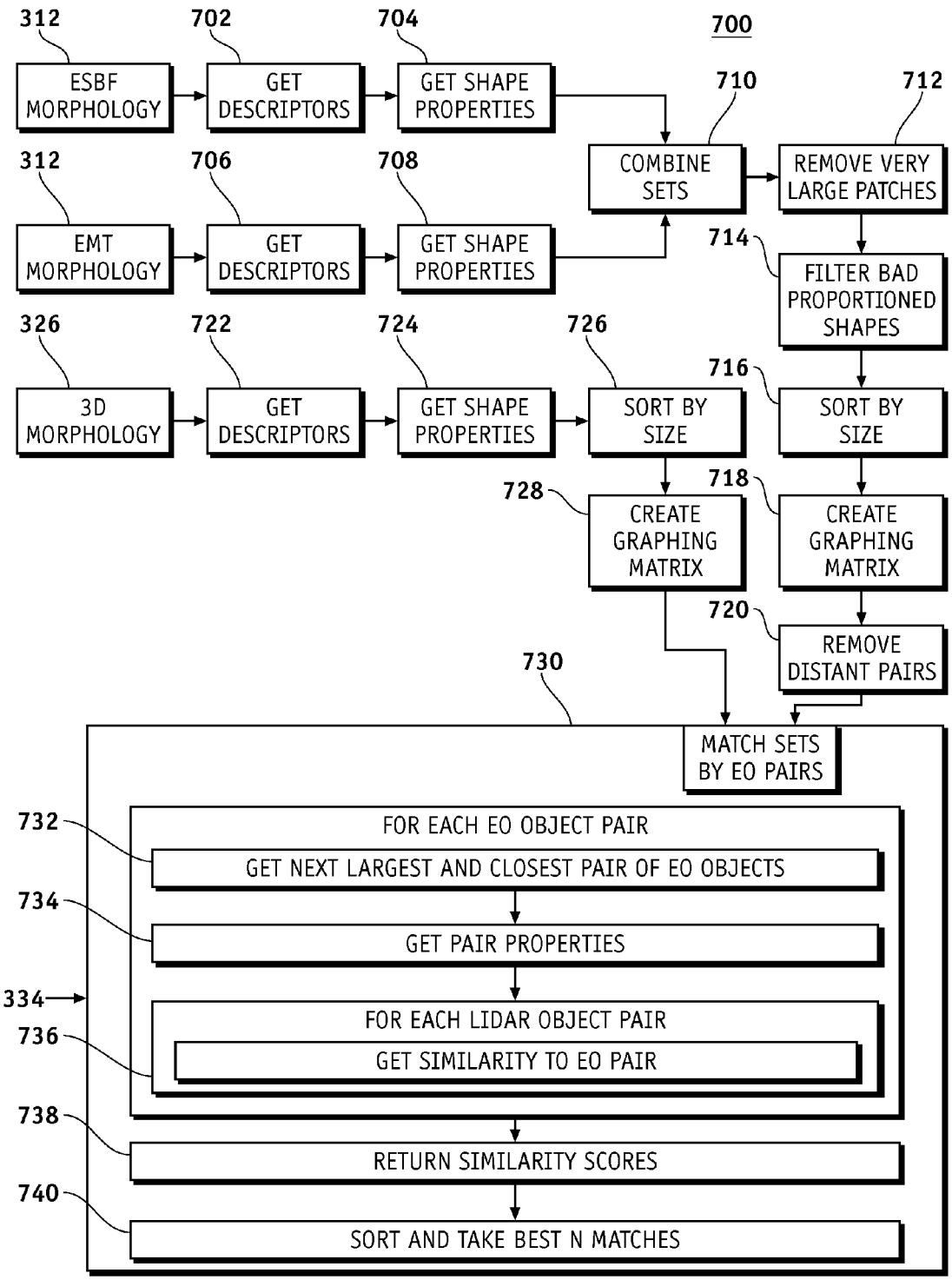
FIG. 7 is an illustration of an exemplary flowchart showing a process for registration of 2-D and three-dimensional (3-D) images according to an embodiment of the disclosure.

FIG. 7 is an illustration of an exemplary flowchart showing a process 700 for registration of two and three-dimensional images according to an embodiment of the disclosure. The various tasks performed in connection with process 700 may be performed mechanically, by software, hardware, firmware, a computer-readable medium having computer executable instructions for performing the process method, or any combination thereof. It should be appreciated that process 700 may include any number of additional or alternative tasks, the tasks shown in FIG. 7 need not be performed in the illustrated order, and process 700 may be incorporated into a more comprehensive procedure or process having additional functionality not described in detail herein.

For illustrative purposes, the following description of process 700 may refer to elements mentioned above in connection with FIGS. 3-6. In some embodiments, portions of the process 700 may be performed by different elements of the system 300 such as: the regional maxima transform module 302, the filter module 308, the 2-D morphology module 312, the 2-D shape extraction module 316, the height slice module 320, the 3-D morphology module 326, the 3-D shape extraction module 330, the constellation matching module 334, the processor module 336, the memory module 338, the camera pose and location estimator 340 etc. Process 700 may have functions, material, and structures that are similar to the embodiments shown in FIGS. 3-6. Therefore common features, functions, and elements may not be redundantly described here.

Process 700 may begin by getting descriptors of the processed EO 2-D image 310 using edge segmentation and boundary fill (ESBF) (task 702).

Process 700 may continue by getting shape properties of the processed EO 2-D image 310 using the descriptors (task 704).

Process 700 may continue by simultaneously or in parallel with the task 702 getting descriptors of the processed EO 2-D image 310 (task 706).

Process 700 may continue by getting shape properties of the processed EO 2-D image 310 (task 708).

Process 700 may continue by combining shape properties sets from tasks 704 and 708 (task 710).

Process 700 may continue by removing very large patches (task 712).

Process 700 may continue by filtering bad properties shapes (task 714).

Process 700 may continue by sorting by size (task 716).

Process 700 may continue by creating graphing matrix (task 718).

Process 700 may continue removing distant pairs (task 720).

Process 700 may continue by simultaneously or in parallel with the tasks 702 and 706 getting descriptors of the by the 3-D point cloud 324 (task 722).

Process 700 may continue by combining slices and getting shape properties (task 724).

Process 700 may continue by sorting by size (task 726).

Process 700 may continue by creating graphing matrix using the LIDAR morphology module 326 (task 728).

Process 700 may continue by matching sets by EO pairs using the constellation matching module 334 (task 730) as explained in more detail in tasks 732-740 described below. Shapes are matched between the 2-D EO images 310 and the 3-D point cloud 324 and then bets three matches are selected.

Process 700 may continue by getting next largest and closet pair of EO objects (task 732).

Process 700 may continue by getting pair properties of the pair of EO objects (task 734).

Process 700 may continue by getting similarities to the EO pairs for each pair LIDAR object pair (task 736).

Process 700 may continue by returning similarities scores (task 738).

Process 700 may continue by sorting and taking best N matches (where N is an integer) (task 740).

Figure 8:
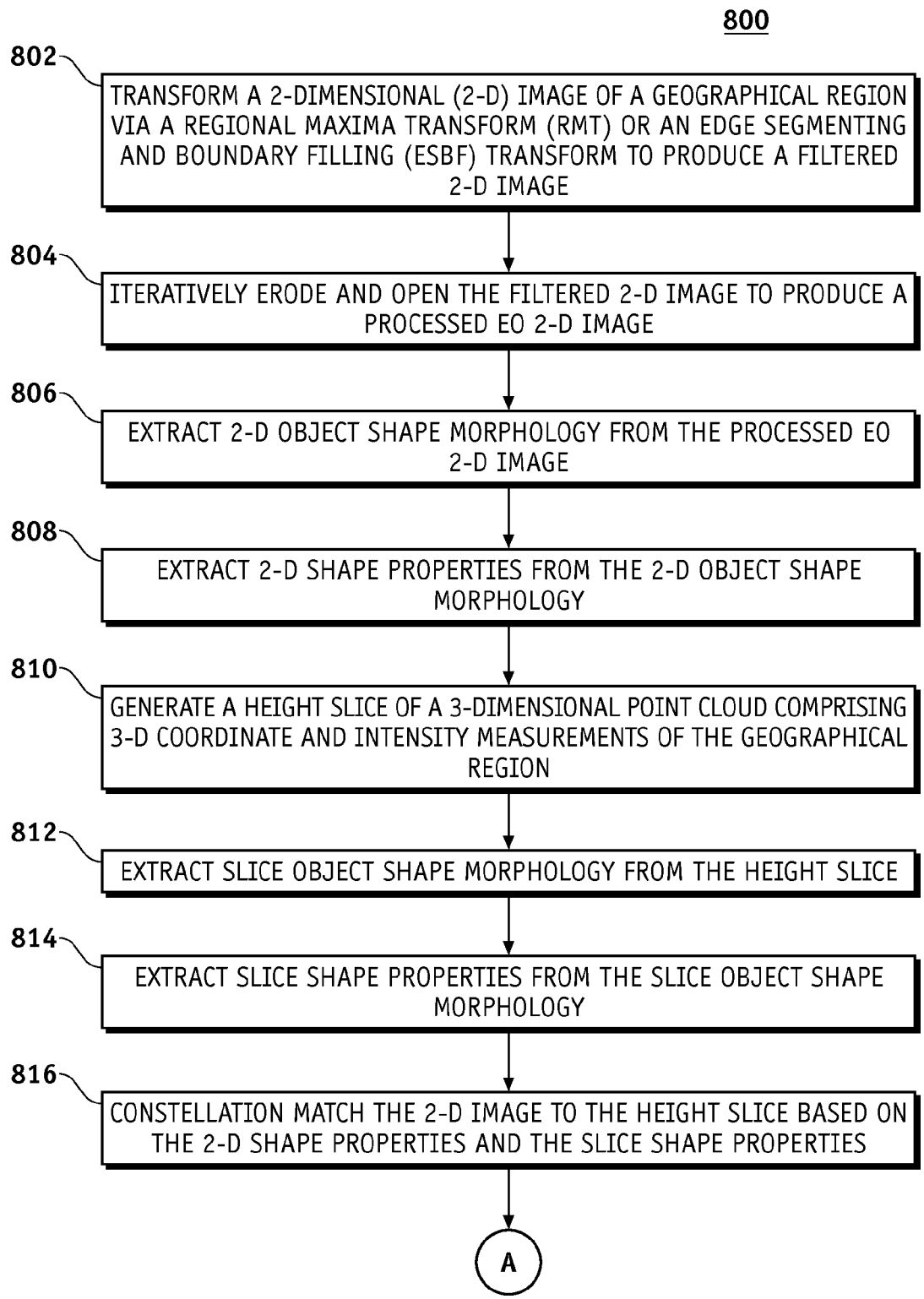
FIG. 8 is an illustration of an exemplary flowchart showing a process for registration of 2-D and 3-D images according to an embodiment of the disclosure.
Figure 8:
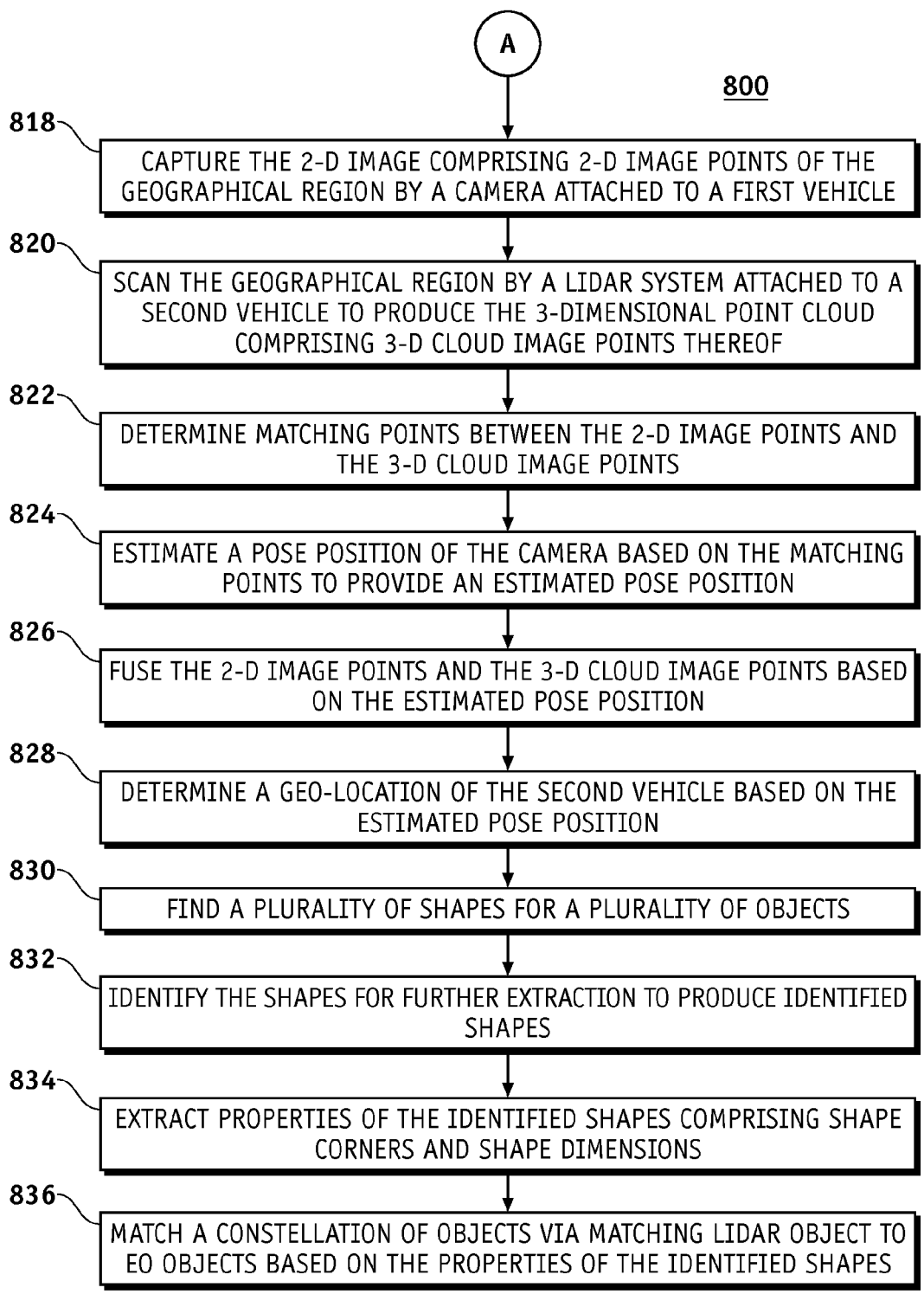

FIG. 8 is an illustration of an exemplary flowchart for registration of two and three-dimensional images according to an embodiment of the disclosure. The various tasks performed in connection with process 800 may be performed mechanically, by software, hardware, firmware, a computer-readable medium having computer executable instructions for performing the process method, or any combination thereof. It should be appreciated that process 800 may include any number of additional or alternative tasks, the tasks shown in FIG. 8 need not be performed in the illustrated order, and process 800 may be incorporated into a more comprehensive procedure or process having additional functionality not described in detail herein.

For illustrative purposes, the following description of process 800 may refer to elements mentioned above in connection with FIGS. 3-6. In some embodiments, portions of the process 800 may be performed by different elements of the system 300 such as: the regional maxima transform module 302, the filter module 308, the 2-D morphology module 312, the 2-D shape extraction module 316, the height slice module 320, the 3-D morphology module 326, the 3-D shape extraction module 330, the constellation matching module 334, the processor module 336, the memory module 338, the camera pose and location estimator 340, etc. Process 800 may have functions, material, and structures that are similar to the embodiments shown in FIGS. 3-6. Therefore common features, functions, and elements may not be redundantly described here.

Process 800 may begin by transforming a 2-dimensional (2-D) image of a geographical region via a regional maxima transform (RMT) or an edge segmenting and boundary filling (ESBF) transform to produce a filtered 2-D image (task 802).

Process 800 may continue by iteratively eroding and opening the filtered 2-D image to produce a processed electro-optical (EO) 2-D image (task 804).

Process 800 may continue by extracting 2-D object shape morphology from the processed EO 2-D image (task 806).

Process 800 may continue by the extracting 2-D shape properties from the 2-D object shape morphology (task 808).

Process 800 may continue by generating a height slice of a 3-dimensional point cloud comprising 3-D coordinate and intensity measurements of the geographical region (task 810).

Process 800 may continue by extracting slice object shape morphology from the height slice (task 812).

Process 800 may continue by extracting slice shape properties from the slice object shape morphology (task 814).

Process 800 may continue by constellation matching the 2-D image to the height slice based on the 2-D shape properties and the slice shape properties (task 816).

Process 800 may continue by capturing the 2-D image comprising 2-D image points of the geographical region by a camera attached to a first vehicle (task 818).

Process 800 may continue by scanning the geographical region by a LIDAR system attached to a second vehicle to produce the 3-dimensional point cloud comprising 3-D cloud image points thereof (task 820).

Process 800 may continue by determining matching points between the 2-D image points and the 3-D cloud image points (task 822).

Process 800 may continue by estimating a pose position of the camera based on the matching points to provide an estimated pose position (task 824).

Process 800 may continue by fusing the 2-D image points and the 3-D cloud image points based on the estimated pose position (task 826). Fusing the 2-D image points and the 3-D cloud image points may comprise coloring the 3-D cloud image points with the 2-D image points.

Process 800 may continue by determining a geo-location of the second vehicle based on the estimated pose position (task 828).

Process 800 may continue by finding a plurality of shapes for a plurality of objects (task 830).

Process 800 may continue by identifying the shapes for further extraction to produce identified shapes (task 832).

Process 800 may continue by extracting properties of the identified shapes comprising shape corners and shape dimensions (task 834).

Process 800 may continue by matching a constellation of objects via matching LIDAR object to EO objects based on the properties of the identified shapes (task 836).

In this way, a system and method is provided for registration of two and three-dimensional images. In this manner, a location of an object or a vehicle can be accurately determined from these two and three-dimensional images.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In this document, the term "module" as used herein, refers to software, firmware, hardware, and any combination of these elements for performing the associated functions described herein. Additionally, for purpose of discussion, the various modules are described as discrete modules; however, as would be apparent one of skilled in the art, two or more modules may be combined to form a single module that performs the associated functions according the embodiments of the present disclosure.

In this document, the terms "computer program product", "computer-readable medium", and the like may be used generally to refer to media such as, for example, memory, storage devices, or storage unit. These and other forms of computer-readable media may be involved in storing one or more instructions for use by the processor module 336, perform specified operations. Such instructions, generally referred to as "computer program code" or "program code" (which may be grouped in the form of computer programs or other groupings), when executed, enable a method of using the system 300.

The above description refers to elements or nodes or features being "connected" or "coupled" together. As used herein, unless expressly stated otherwise, "connected" should be interpreted to mean that one element/node/feature is directly joined to (or directly communicates with) another element/node/feature, and not necessarily mechanically. Likewise, unless expressly stated otherwise, "coupled" should be interpreted to mean that one element/node/feature is directly or indirectly joined to (or directly or indirectly communicates with) another element/node/feature, and not necessarily mechanically. Thus, although FIG. 3 depicts an example arrangement of elements, additional intervening elements, devices, features, or components may be present in a configuration of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases shall not be read to mean that the narrower case is intended or required in instances where such broadening phrases may be absent.

The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for registration of two and three-dimensional (3-D) images, the method comprising:
   capturing a 2-dimensional (2-D) image comprising 2-D image points of a geographical region by a camera attached to a first vehicle;
   transforming the 2-dimensional (2-D) image of the geographical region via a regional maxima transform or an edge segmenting and boundary filling (ESBF) transform to produce a filtered 2-D image;
   iteratively eroding and opening the filtered 2-D image to produce a processed electro-optical (EO) 2-D image;
   extracting 2-D object shape morphology from the processed EO 2-D image;
   extracting 2-D shape properties from the 2-D object shape morphology;
   scanning the geographical region by a Light Detection and Ranging (LIDAR) system attached to a second vehicle to produce a 3-dimensional point cloud comprising 3-D cloud image points thereof;
   generating a height slice of the 3-dimensional point cloud comprising 3-D coordinate and intensity measurements of the geographical region;
   extracting slice object shape morphology from the height slice resulting in labeled shapes found in the 2-D slice image;
   extracting slice shape properties from the slice object shape morphology;
   constellation matching the 2-D image to the height slice based on the 2-D shape properties and the slice shape properties;
   determining matching points between the 2-D image points and the 3-D cloud image points;
   estimating a pose position of the camera attached to the first vehicle based on the matching points to provide an estimated pose position;
   determining a geo-location of the first vehicle based on the estimated pose position of the camera attached to the first vehicle; and
   based on the matching points, generating a colorized 3-dimensional point cloud wherein at least some of the 3-D cloud image points of the 3-dimensional point cloud are given a color of an object taken from the 2-D image.

2. The method of claim 1, wherein the 3-D coordinate and intensity measurements comprise Light Detection and Ranging (LIDAR) measurements.

3. The method of claim 1, further comprising fusing the 2-D image points and the 3-D cloud image points based on the estimated pose position.

4. The method of claim 1, further comprising:
   finding a plurality of shapes for a plurality of objects;
   identifying the shapes for further extraction to produce identified shapes;
   extracting properties of the identified shapes comprising shape corners and shape dimensions; and matching a constellation of objects via matching LIDAR object to EO objects based on the properties of the identified shapes.

5. A system for registration of two and three-dimensional images, the system comprising:
   a first vehicle system configured to image a 2-dimensional (2-D) image comprising 2-D image points of a geographical region by a camera attached to a first vehicle;
   a second vehicle system configured to scan a 3-dimensional point cloud comprising 3-D cloud image points of the geographical region by a Light Detection and Ranging (LIDAR) system attached to a second vehicle;
   a processor;
   memory storing instructions executable by the processor to perform functions comprising:
   transforming the 2-dimensional (2-D) image of the geographical region via a regional maxima transform or an edge segmenting and boundary filling (ESBF) transform to produce a filtered 2-D image;
   iteratively eroding and opening the filtered 2-D image to produce a processed electro-optical (EO) 2-D image;
   extracting 2-D object shape morphology from the processed EO 2-D image;
   extracting 2-D shape properties from the 2-D object shape morphology;
   generating a height slice of the 3-dimensional (3-D) point cloud comprising LIDAR measurements of the geographical region;
   extracting slice object shape morphology from the height slice resulting in labeled shapes found in the 2-D slice image;
   extracting slice shape properties from the slice object shape morphology;
   constellation matching the 2-D image to the height slice based on the 2-D shape properties and the slice shape properties;
   matching points of the 2-D image and the 3-dimensional point cloud based on the 2-D shape properties and the slice shape properties to produce a plurality of matched points;
   estimating a pose position of the camera based on the matched points to provide an estimated pose position;
   determining a geo-location of the first vehicle based on the estimated pose position of the camera attached to the first vehicle; and
   based on the matching points, generating a colorized 3-dimensional point cloud wherein at least some of the 3-D cloud image points of the 3-dimensional point cloud are given a color of an object taken from the 2-D image.

6. A non-transitory computer readable storage medium comprising computer-executable instructions for registration of two and three-dimensional (3-D) images, the computer-executable instructions comprising:
   capturing a 2-dimensional (2-D) image comprising 2-D image points of a geographical region by a camera attached to a first vehicle;
   transforming the 2-dimensional (2-D) image of the geographical region via a regional maxima transform or an edge segmenting and boundary filling (ESBF) transform to produce a filtered 2-D image;
   iteratively eroding and opening the filtered 2-D image to produce a processed electro-optical (EO) 2-D image;
   extracting 2-D object shape morphology from the processed EO 2-D image;
   extracting 2-D shape properties from the 2-D object shape morphology;
   scanning the geographical region by a Light Detection and Ranging (LIDAR) system attached to a second vehicle to produce a 3-dimensional point cloud comprising 3-D cloud image points thereof;
   generating a height slice of the 3-dimensional point cloud comprising LIDAR measurements of the geographical region;
   extracting slice object shape morphology from the height slice resulting in labeled shapes found in the 2-D slice image;
   extracting slice shape properties from the slice object shape morphology;
   constellation matching the 2-dimensional (2-D) image to the height slice based on the 2-D shape properties and the slice shape properties;
   determining matching points between 2-D image points and 3-D cloud image points to produce a plurality of matched points;
   estimating a pose position of a camera based on the matched points to provide an estimated pose position;
   determining a geo-location of the first vehicle based on the estimated pose position of the camera attached to the first vehicle; and
   based on the matching points, generating a colorized 3-dimensional point cloud wherein at least some of the 3-D cloud image points of the 3-dimensional point cloud are given a color of an object taken from the 2-D image.

7. The non-transitory computer readable storage medium of claim 6, further comprising computer-executable instructions for: fusing the 2-D image points and the 3-D cloud image points based on the estimated pose position.

8. The non-transitory computer readable storage medium of claim 6, further comprising computer-executable instructions for:
   finding a plurality of shapes for a plurality of objects;
   identifying the shapes for further extraction to produce identified shapes;
   extracting properties of the identified shapes comprising shape corners and shape dimensions; and
   matching a constellation of objects via matching LIDAR object to EO objects based on the properties of the identified shapes.

9. The method of claim 1, wherein the 3-dimensional point cloud is calibrated into world coordinates, and the method further comprises:
   determining the geo-location of the first vehicle relative to the world coordinates of the matching points of the 3-D cloud image points of the 3-dimensional point cloud and the 2-D image points.

10. The system of claim 5, wherein the 3-dimensional point cloud is calibrated into world coordinates, and the functions further comprise:
    determining the geo-location of the first vehicle relative to the world coordinates of the matching points of the 3-D cloud image points of the 3-dimensional point cloud and the 2-D image points.

11. The non-transitory computer readable storage medium of claim 6, wherein the 3-dimensional point cloud is calibrated into world coordinates, and further comprising computer-executable instructions for:
    determining the geo-location of the first vehicle relative to the world coordinates of the matching points of the 3-D cloud image points of the 3-dimensional point cloud and the 2-D image points.

12. A method for registration of two and three-dimensional (3-D) images, the method comprising:
- capturing a 2-dimensional (2-D) image comprising 2-D image points of a geographical region by a camera attached to a first vehicle;
- scanning the geographical region by a Light Detection and Ranging (LIDAR) system attached to a second vehicle to produce a 3-dimensional point cloud comprising 3-D cloud image points thereof;
- determining matching points between the 2-D image points and the 3-D cloud image points by;
  - finding a plurality of shapes for a plurality of objects;
  - identifying the shapes for further extraction to produce identified shapes;
  - extracting properties of the identified shapes comprising shape corners and shape dimensions; and
  - matching a constellation of objects via matching LIDAR object to 2D objects based on the properties of the identified shapes;
- estimating a pose position of the camera attached to the first vehicle based on the matching points to provide an estimated pose position;
- determining a geo-location of the first vehicle based on the estimated pose position of the camera attached to the first vehicle; and
- based on the matching points, generating a colorized 3-dimensional point cloud wherein at least some of the 3-D cloud image points of the 3-dimensional point cloud are given a color of an object taken from the 2-D image.

13. The method of claim 12, wherein the 3-dimensional point cloud is calibrated into world coordinates, and the method further comprises:
- determining the geo-location of the first vehicle relative to the world coordinates of the matching points of the 3-D cloud image points of the 3-dimensional point cloud and the 2-D image points.

14. The method of claim 12, further comprising fusing the 2-D image points and the 3-D cloud image points based on the estimated pose position.

15. The method of claim 12, wherein determining matching points between the 2-D image points and the 3-D cloud image points comprises:
- transforming the 2-dimensional (2-D) image of the geographical region via a regional maxima transform or an edge segmenting and boundary filling (ESBF) transform to produce a filtered 2-D image.

16. The method of claim 15, wherein determining matching points between the 2-D image points and the 3-D cloud image points further comprises:
- iteratively eroding and opening the filtered 2-D image to produce a processed electro-optical (EO) 2-D image;
- extracting 2-D object shape morphology from the processed EO 2-D image; and
- extracting 2-D shape properties from the 2-D object shape morphology.

17. The method of claim 12, further comprising:
- generating a height slice of the 3-dimensional point cloud comprising 3-D coordinate and intensity measurements of the geographical region;
- extracting slice object shape morphology from the height slice resulting in labeled shapes found in the 2-D slice image;
- extracting slice shape properties from the slice object shape morphology; and
- constellation matching the 2-D image to the height slice.

18. The method of claim 17, wherein the 3-D coordinate and intensity measurements comprise Light Detection and Ranging (LIDAR) measurements.

19. The method of claim 12, wherein the 3-D cloud image points have an intensity corresponding to a reflectivity of an object represented by the 3-D cloud image points, and wherein generating the colorized 3-dimensional point cloud comprises:
- generating an enhanced point cloud with true colors.

* * * * *